United States Patent
Kitajima et al.

(10) Patent No.: US 6,317,230 B1
(45) Date of Patent: Nov. 13, 2001

(54) OPTICAL CROSS-CONNECT SYSTEM AND OPTICAL TRANSMISSION SYSTEM

(75) Inventors: Shigeki Kitajima, Kawasaki (JP); Shoichi Hanatani, Richardson; Hirohisa Sano, Dallas, both of TX (US); Tatsuo Kanetake, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/114,855

(22) Filed: Jul. 14, 1998

Related U.S. Application Data

(63) Continuation-in-part of application No. 09/025,854, filed on Feb. 19, 1998.

(30) Foreign Application Priority Data

Feb. 24, 1997 (JP) .................................................. 9-039238
Jul. 15, 1997 (JP) .................................................. 9-189459

(51) Int. Cl.[7] .................................................. H04B 10/08
(52) U.S. Cl. .............................. 359/110; 359/117; 385/17
(58) Field of Search .................................... 359/110, 117, 359/128, 139; 385/17

(56) References Cited

U.S. PATENT DOCUMENTS

| | | | |
|---|---|---|---|
| 5,870,212 | * 2/1999 | Nathan et al. .................. | 359/110 |
| 6,038,044 | * 3/2000 | Fee et al. ......................... | 359/110 |
| 6,046,832 | * 4/2000 | Fishman .......................... | 359/110 |
| 6,160,928 | * 12/2000 | Schroeder ....................... | 385/17 |

OTHER PUBLICATIONS

"A Novel Optical Cross–connect System for Hitless Optical Network Reconfiguration" Shiragaki et al. Autumn, 1993, IEICE.

"A Novel Optical Cross–Connect Architecture for Restoration in Backbone Networks" Sano et al. Apr. 1997 Royal Institute of Technology.

* cited by examiner

Primary Examiner—Kinfe-Michael Negash
(74) Attorney, Agent, or Firm—Antonelli, Terry, Stout & Kraus, LLP

(57) ABSTRACT

Input/output fibers for the optical cross-connect system are classified into working fibers and protecting fibers. In a normal time (a state in which there occurs no failure), there turns out to be a one-to-one correspondence between a line terminal and a working fiber. Namely, connection property required for the switch matrix in the optical cross-connect system is not necessarily strictly non-blocking connections among all of the fibers. The connection property is a one-to-one connection relationship with the working fibers, and is a predetermined connection relationship with the protecting fibers at the time of a failure occurrence. Utilization thereof makes it possible to extremely downsize scale of the switch.

15 Claims, 9 Drawing Sheets

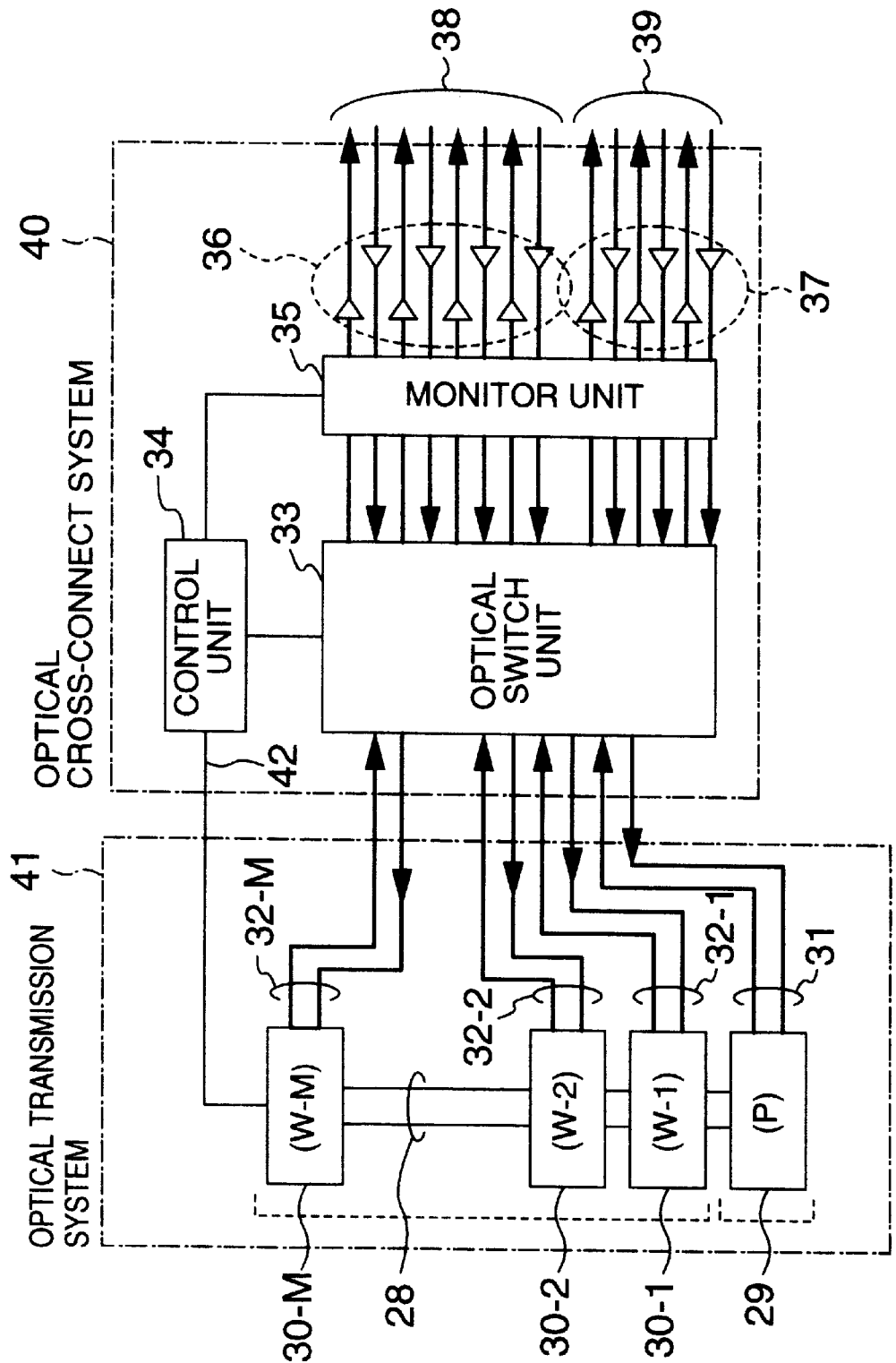

OPTICAL CROSS-CONNECT SYSTEM AND OPTICAL TRANSMISSION SYSTEM

CROSS-REFERENCE TO RELATED APPLICATION

The present application is a Continuation-In-Part of U.S. patent application Ser. No. 09/025,854 filed on Feb. 19, 1998 (priority: Japanese Patent Application No. 09-039238 filed on Feb. 24, 1997) and assigned to Hitachi, Ltd. The content of that application is incorporated herein by reference.

The present application also relates to U.S. patent application Ser. No. 09/022,004 filed on Feb. 11, 1998 (priority: Japanese Patent Application No. 09-033779 filed on Feb. 18, 1997) and assigned to the present assignee, and U.S. patent application Ser. No. 09/106,903 filed on Jun. 30, 1998 (priority: Japanese Patent Application No. 09-187966 filed on Jul. 14, 1997, Japanese Patent Application No. 09-178340 filed on Jul. 3, 1997) and assigned to the present assignee. The contents of those applications are incorporated herein by reference.

BACKGROUND OF THE INVENTION

The present invention relates to an optical cross-connect system and an optical transmission system, and more particularly to an optical cross-connect system and an optical transmission system which allow a line or a path for a high-speed optical signal to be switched with the signal light itself unconverted.

Recent advances in optical transmission technology are rapidly making it possible to increase capacity on a network up to a high-capacity level. This also means, however, that when a failure occurs, the damage can not help being expanded accordingly. This situation makes it urgent to construct a network with a high reliability. In prior arts, a cross-connect system played a role of specifying a by-pass route around a portion at which the failure occurs. However, the cross-connect system, which necessitated an electro/optical conversion and a multiplexing division into low-speed signals, found it difficult to process such a high-capacity optical signal. In view of the circumstances, developed at many places is an optical cross-connect system which allows the high-speed optical signal to be switched with the signal light itself unconverted, i.e. without performing the electro/optical conversion thereof. FIG. 1 shows a configuration embodiment of a network which introduced into is an optical cross-connect system and has a function of automatically avoiding a failure. In FIG. 1A, which indicates a normal state, line terminals 1 are connected with each other through a working optical fiber 3. On the other hand, FIG. 1B indicates a state in which there takes place a failure in the working optical fiber 3 between a terminal station A and a terminal station B. More concretely, illustrated schematically in FIG. 1B is a situation in which an optical cross-connect system 2, through a protecting optical fiber 4, forms a by-pass route by way of a terminal station C, thus making it possible to restore the transmission path.

Mentioned as a literature of an optical cross-connect system having such a failure-restoring function is "A Novel Optical Cross-connect System for Hitless Optical Network Reconfiguration", a presentation No. SB-8-1 at an autumn general conference held in 1993 under Institute of Electronics, Information and Communication Engineers. Proposed and studied in the report are a 64×64 switch matrix and an optical cross-connect system using it. The 64×64 switch matrix is constituted by employing a 8×8 switch matrix as the building block thereof and connecting the 8×8 switch matrices in a three-stage link connection manner. As shown in this embodiment, in related-art optical cross-connect systems, a general method for embodying the high-capacity was as follows: A strictly non-blocking switch matrix is employed as the fundamental building block and then performing a link connection of the matrices, thereby embodying the high-capacity. Here, the switch matrix means a switch configuration in such a broader meaning as to make it possible to switch and connect a plurality of inputs and a plurality of outputs, and includes configurations such as a tree type switch configuration.

As shown in FIG. 1, the optical cross-connect system 2 is provided at each node on a network and has a function of changing a connection between a line terminal 1 and a transmission path, i.e. the optical fiber 3 or the optical fiber 4. Illustrated in FIG. 2 is a basic system configuration of an optical cross-connect system in the case where M units of line terminals within a node are connected with an optical switch unit 11 through 2M units of optical fibers 13, and the number of working optical fibers 14 and that of protecting optical fibers 15 are set to be 2M and 2R, respectively. A monitor unit 12 detects failures in the fibers, and the optical switch unit 11, which a control unit 10 controls, performs switching of connections. Optical signals are launched into or out of the optical switch unit 11, i.e. a main unit in the optical cross-connect system, from both the line terminal side and the transmission path side. When organizing the optical signals in accordance with the directions thereof, it has been found that the result is summarized as an optical switch matrix 18. The optical switch matrix 18, as shown in FIG. 2B, is a square matrix having 2M+R units of input ports and 2M+R units of output ports, i.e. a switch matrix in which the number of inputs is equal to that of outputs.

Generally speaking, -the optical fibers 14 or the optical fibers 15 are installed as a cable produced by bundling about 24 to 47 units of the optical fibers in total, and connected with each node are cables originating from a plurality of neighboring nodes. Accordingly, the number of the optical fibers for each node extends to a scale of 200 to 300. This requires that the optical crossconnect system, which operates with these optical fibers, also have a high capacity corresponding thereto. The biggest problem in embodying such a high-capacity optical cross-connect system lies in making the optical switch unit 11, i.e. the main unit in the optical cross-connect system, into a large scale switch matrix.

Combination of a plurality of optical switch devices makes it possible to embody such a large scale switch matrix. It is desirable that scale of each optical switch device itself is large, i.e. the degree of integration thereof is high. The degree of integration of an optical device, however, is generally so much lower compared with that of an electronic device. For example, as described in the related art, it is close to a limit of the present-day technology to integrate the 8×8 switch matrices on a single chip. Also, structures of optical switch devices employed in currently embodied integrated-type switch devices (such as 4×4, and 8×8) are generally inferior to those of single-type switch devices (such as 1×2, and 2×2) in the fundamental characteristics such as isolation at the time of switching and the insertion loss. This inevitably gives rise to a deterioration in the optical signal quality at the time of switching, thus making it difficult to apply to the high-speed signal the large scale switch matrix which is embodied using the integrated-type switch devices.

Meanwhile, when constituting the switch matrix with the use of the single-type switch devices of excellent fundamental performance, in order to make the capacity of the matrix higher, there are needed conditions such as an increase in the number of the members and a processing of optical wiring among the devices. This inevitably brings about a rapid increase in the system scale, thus making it difficult to embody a switch matrix on a scale of practical use. Moreover, even when employing the high-performance single-type switch devices, optical amplifiers 16 and 17 in FIG. 2 become essential owing to compensation for the insertion loss. This results in problems such as a deterioration in the optical S/N ratio of the signal due to an occurrence of optical noise at the time of amplifying the signal light, or an increase in the system cost due to an increase in the number of the amplifiers.

As described above, in trying to embody an optical cross-connect system of practical use, it has become the most important problem to develop a large scale switch matrix which when applied to a high-speed optical signal, gives rise to a less deterioration in the signal quality.

SUMMARY OF THE INVENTION

When considering an optical transmission system from a practical point of view, a fiber can basically be divided into a working part, which is ordinarily used, and a protecting part, which is used when a failure occurs. Consequently, input/output fibers for the optical cross-connect system are similarly classified into working fibers and protecting fibers. Thus, it turns out that in a normal time (a state in which there occurs no failure), there exists a one-to-one correspondence between a line terminal and a working fiber. Namely, connection property required for the switch matrix in the optical cross-connect system is not necessarily strictly non-blocking connections among all of the fibers. The connection property is a one-to-one connection relationship with the working fibers at the time of using the working system, and is a predetermined connection relationship with the protecting fibers at the time of a failure occurrence. Utilization thereof makes it possible to extremely downsize scale of the switch.

Downsizing scale of the switch makes it possible to suppress a deterioration in optical signal quality to a minimum as well as to bring about an enhancement in the reliability and a reduction in the cost due to a decrease in the number of the members.

BRIEF DESCRIPTION OF THE DRAWINGS

Preferred embodiments of the present invention will now be described in conjunction with the accompanying drawings, in which;

FIG. 1A shows a normal time, and FIG. 1B shows a time when a failure occurs in a fiber;

FIG. 5A shows comparison in the number of optical switch devices needed, and FIG. 5B shows comparison in the number of optical amplifiers needed;

FIG. 6A is a diagram for explaining a configuration of the optical switch unit, and FIGS. 6B and 6C are diagrams for explaining a configuration of a perfect tree type optical switch and that of a partial tree type optical switch, respectively;

FIG. 7 is a diagram for explaining a configuration of an optical switch unit in an optical cross-connect system as a further embodiment according to the present invention;

FIG. 8A is a diagram for explaining a configuration of the optical switch unit, and FIGS. 8B and 8C show configuration embodiments of a switching switch unit for working system/protecting system;

DESCRIPTION OF THE PREFERRED EMBODIMENTS

Figure 3:
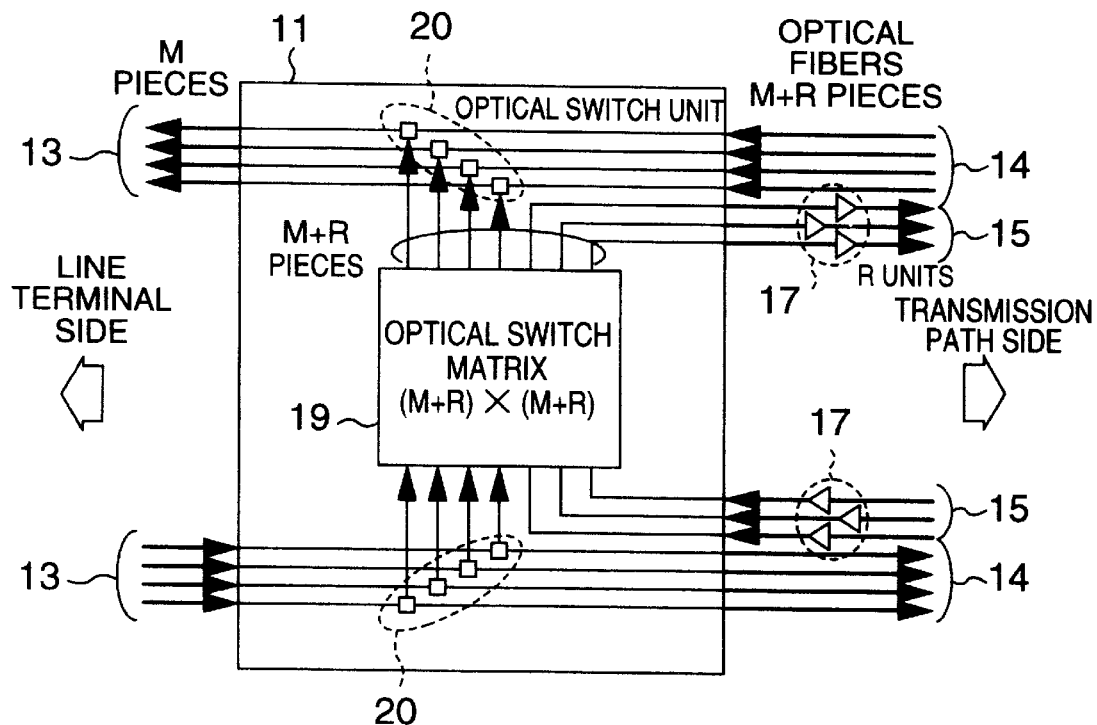
FIG. 3 is a diagram for explaining a configuration of an optical switch unit in an optical cross-connect system as an embodiment according to the present invention.
Figure 10:
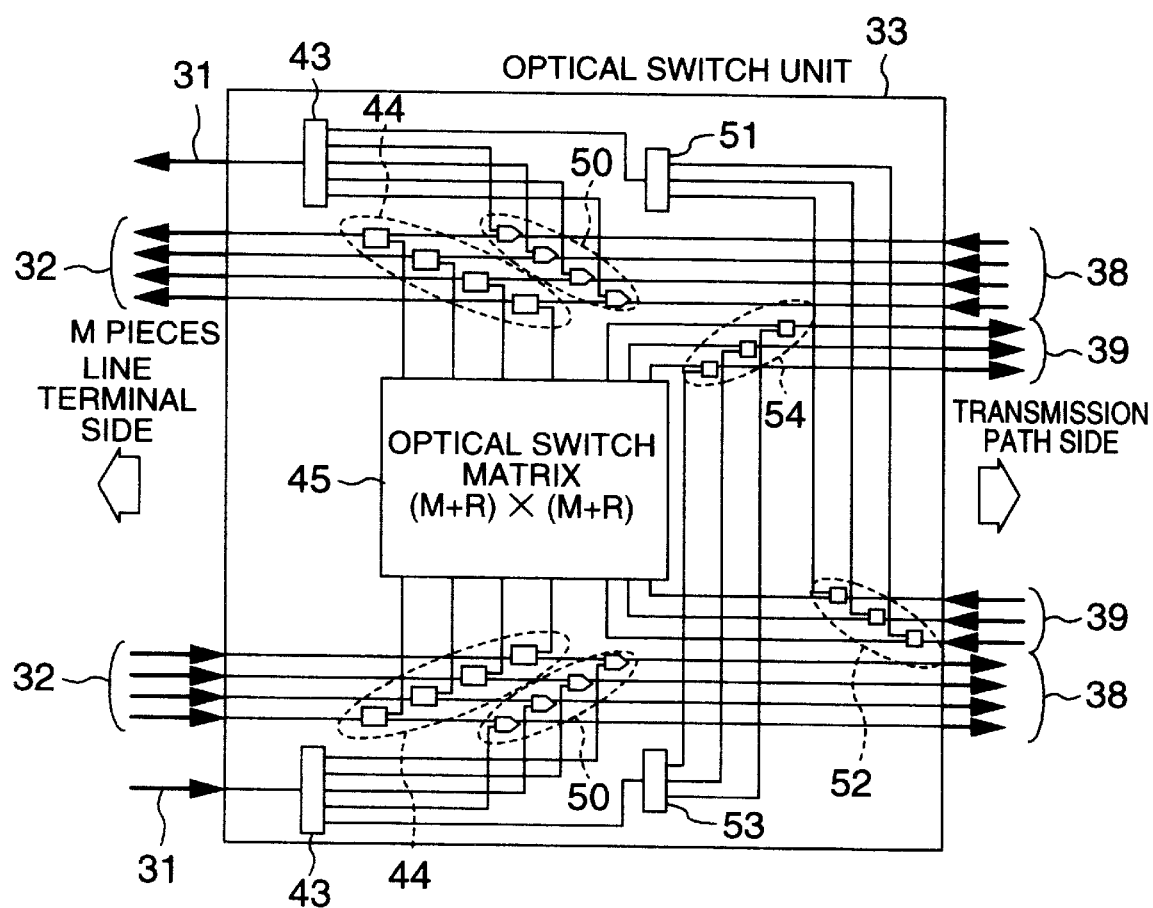
FIG. 10 is a diagram for explaining a configuration of an optical switch unit in an optical cross-connect system as an additional embodiment according to the present invention.

Described below, using FIG. 3 or FIG. 10, are embodiments according to the present invention.

FIG. 3 shows an embodiment of the present invention. FIG. 3 represents a configuration of an optical switch unit 11, i.e. a main unit in an optical cross-connect system. As is the case with the system configuration in the related art shown in FIG. 2, illustrated in FIG. 3 is the configuration in the case where 2M units of optical fibers 13, with which M units of line terminals are connected, are connected with 2M units of working optical fibers 14 and 2R units of protecting optical fibers 15.

The characteristic of the present embodiment is that the 2M units of optical fibers 13 corresponding to the line terminals are connected with the optical fibers 14 by way of a one-stage optical switch 20 only. The one-stage optical switch 20 performs a switching between the working system and the protecting system, and the structure thereof is a 1×2 switch structure. Connected on the side of port 1 are the optical fibers 13, and connected on the side of port 2 are the optical fiber 14 and an optical switch matrix 19. In the normal time, the optical fibers 13 (line terminals) and the optical fibers 14 (transmission paths), between which there exists a one-to-one correspondence, are connected with each other. Only when there occurs a failure in the optical fibers 14, the optical fibers 13 are connected with the optical switch matrix 19. At the time of a failure occurrence, the optical fibers 13 are connected with the protecting optical fibers 15 by way of the optical switch 20 and the optical switch matrix 19.

Figure 1A:
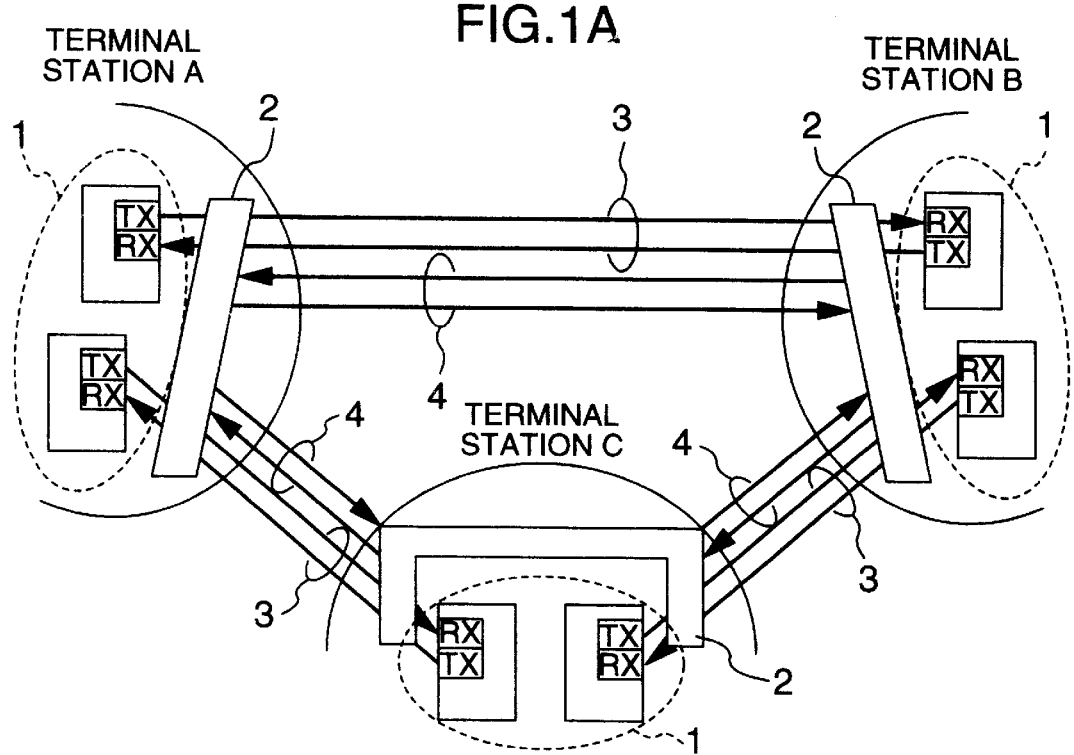
FIGS. 1A and 1B are diagrams for explaining a network configuration in which optical cross-connect systems are employed.
Figure 1B:
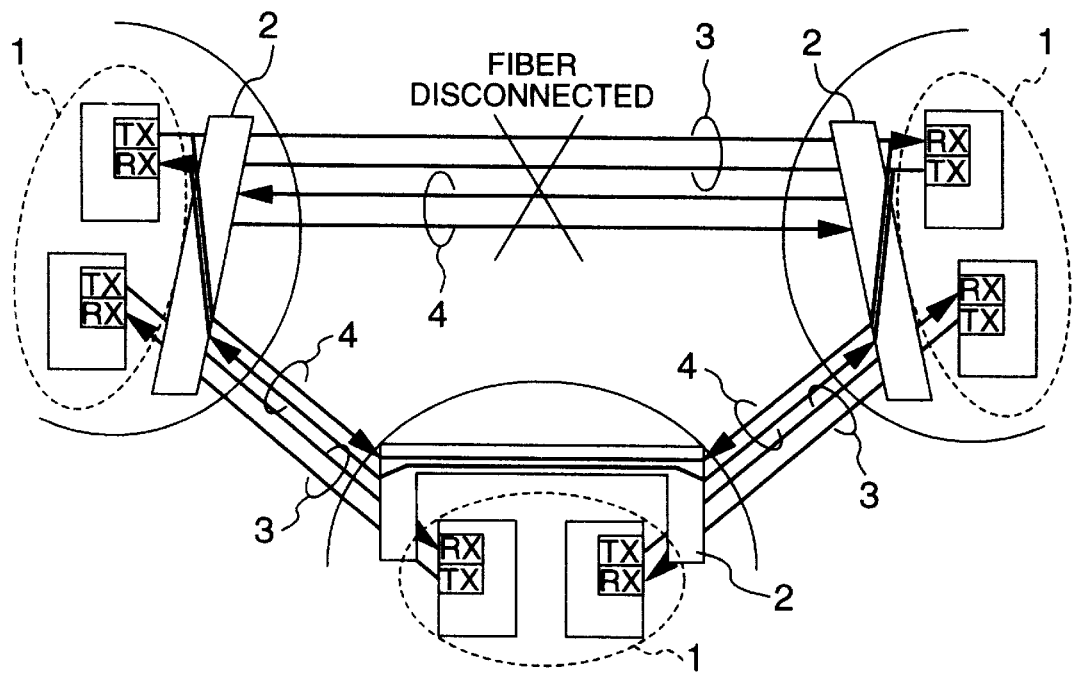
Figure 2A:
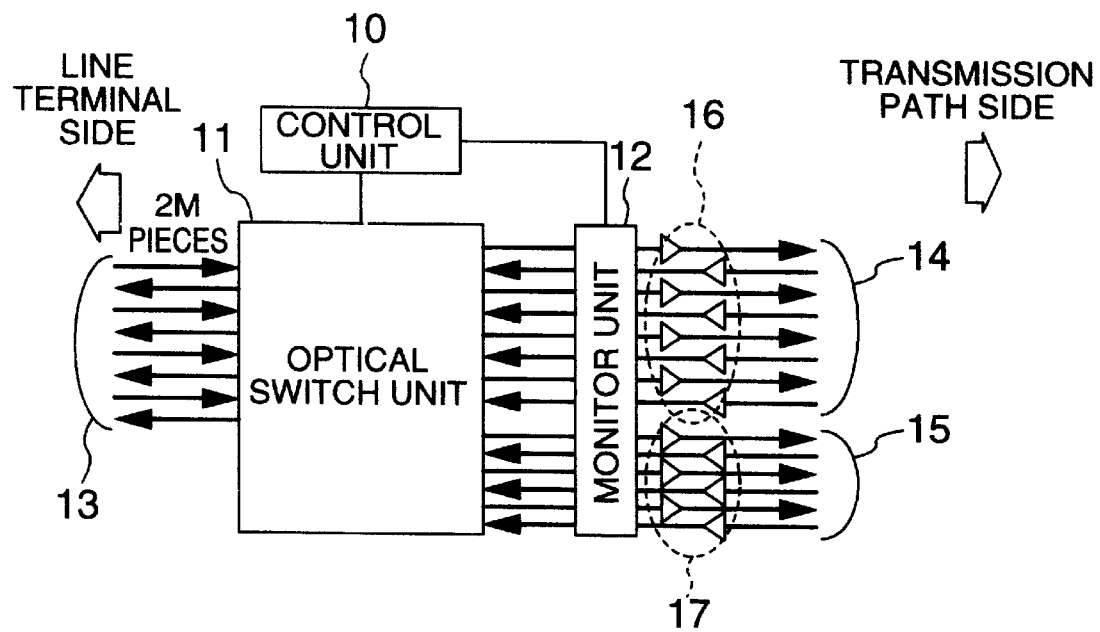
FIG. 2A is a diagram for explaining a system configuration of a related optical cross-connect system.
Figure 2B:
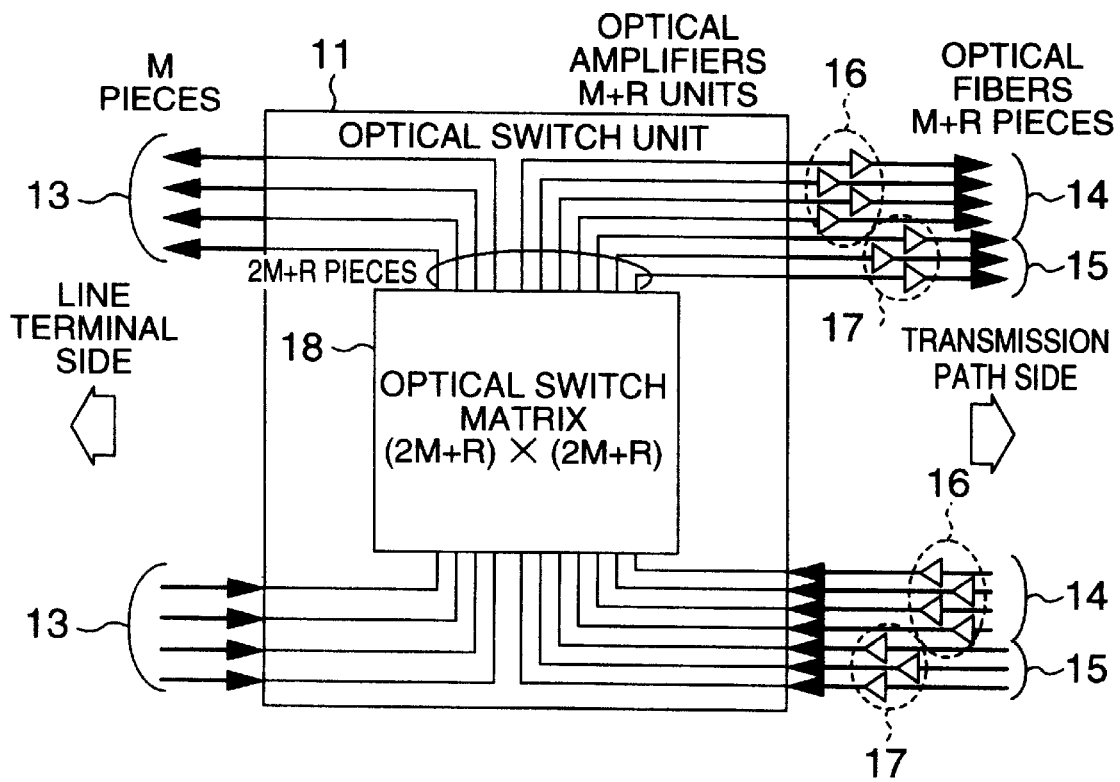
FIG. 2B is a diagram for explaining a configuration of the optical switch unit therein.

In the related system configuration in FIGS. 2A and 2B, connected with the optical switch matrix 18 are all the inputs/outputs, and allotted thereto is a function of changing connections among all the inputs/outputs. In the present embodiment, however, connected with the optical switch matrix 19 are only the following: inputs/outputs by way of the optical switch 20 and the protecting optical fibers 15 by way of optical amplifiers 17. The working optical fibers 14 are not connected with the optical switch matrix 19. The total number 2R of the protecting optical fibers 15 are smaller compared with the total number 2M of the working optical fibers 14. This allows the present invention to considerably decrease the total number of input/output fibers for the matrix switch down to (M+R)×2, thus making it easy to construct the switch matrix.

Also, in the optical cross-connect system in the related art, the optical amplifiers for loss compensation are needed for all the inputs/outputs. On the other hand, in the configuration according to the present invention, it has turned out that the optical amplifiers 17 for loss compensation are needed only for the protecting optical fibers 15 and at the same time the gain needed is small. These advantages result from the following two reasons:

1) In the normal time, the line terminals are connected with the transmission paths by way of the onestage optical switch 20 only, and thus the insertion loss thereof is small enough. This makes unnecessary the optical amplifiers for loss compensation.

2) Downsizing scale of the matrix decreases insertion loss of the switch unit in the protecting system, too.

These make it possible to reduce the system cost and at the same time allow the system to have an excellent effect of suppressing to a small extent a deterioration in optical signal quality within the optical amplifiers.

Also, in the present invention, the optical switch matrix 19 are not directly connected with the working optical fibers 14. This prevents a switching in the switch from exerting an influence on a working transmission system (paths in the optical fibers 13, the optical switch 20, and the optical fibers 14) in which a failure has not occurred, thus making it possible to employ a configuration of a rearrangable non-blocking matrix switch. In the configuration in FIG. 2, however, the working optical fibers 14 are not separated from the optical switch matrix 18. Accordingly, in order to switch a connection into a path in the protecting optical fibers 15 while completely maintaining connections to a working transmission system, it can not be helped to employ a strictly non-blocking matrix switch.

In many cases, the number of switch devices constituting the strictly non-blocking matrix switch is proportional to a square of the number of the input/output ports. Meanwhile, in the case of the rearrangable non-blocking matrix switch, it is known that the switch can be constituted using switch devices the number of which is proportional to N log N. This allows the present invention to have an effect of extremely reducing the number of members of the switch matrix, and what is more, the effect becomes more outstanding when fabricating a high-capacity optical cross-connect system.

Figure 4:
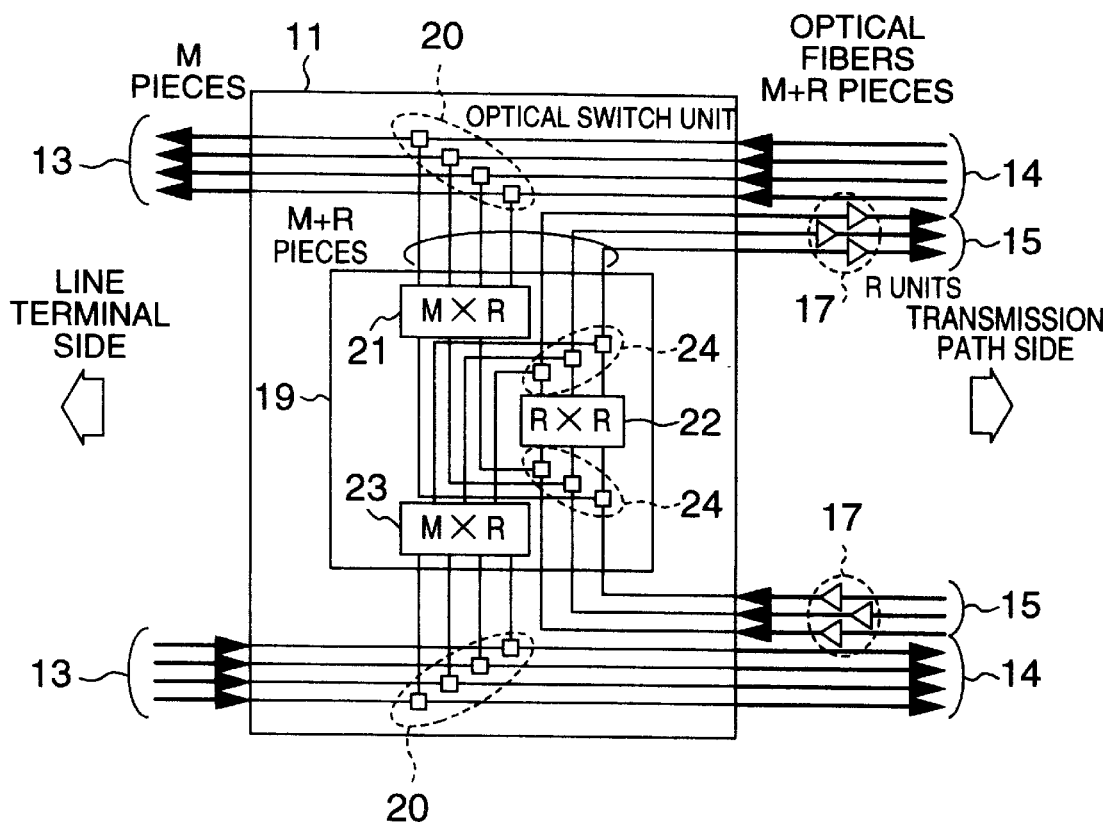
FIG. 4 is a diagram for explaining a configuration of an optical switch unit in an optical cross-connect system as another embodiment according to the present invention.

FIG. 4 shows another embodiment of the present invention. Considering a case of a real network, no connection is made with respect to the kind of connections that result in a loop-back of the transmission path within each node. Accordingly, even if such connections are removed, functions as the optical cross-connect system should not be degraded.

The present embodiment is based on this concept. In the embodiment in FIG. 4, the optical switch matrix is resolved into a plurality of small scale optical switch matrices by removing connections within a node. Comparing FIG. 3 with FIG. 4, it is found that a (M+R)×(M+R) optical switch matrix 19 has been resolved into a unit of R×R optical switch 22, two units of M×R optical switches 21, 23, and 2R units of 1×2 optical switches 24.

Figure 5A:
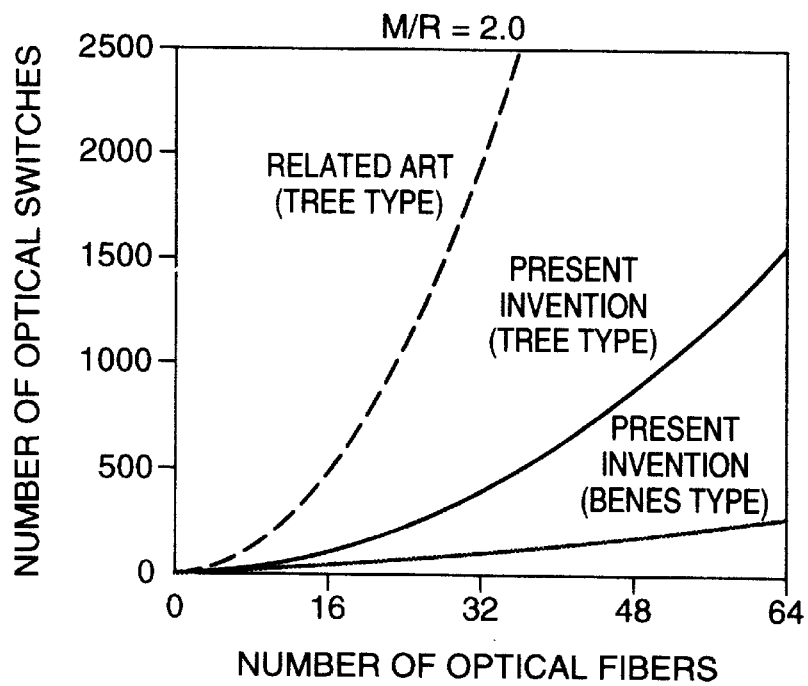
FIGS. 5A and 5B are diagrams for comparing and explaining the two cases, i.e. the embodiment shown in FIG. 4 and a related art, concerning the number of optical switch devices needed and the number of optical amplifiers needed.
Figure 5B:
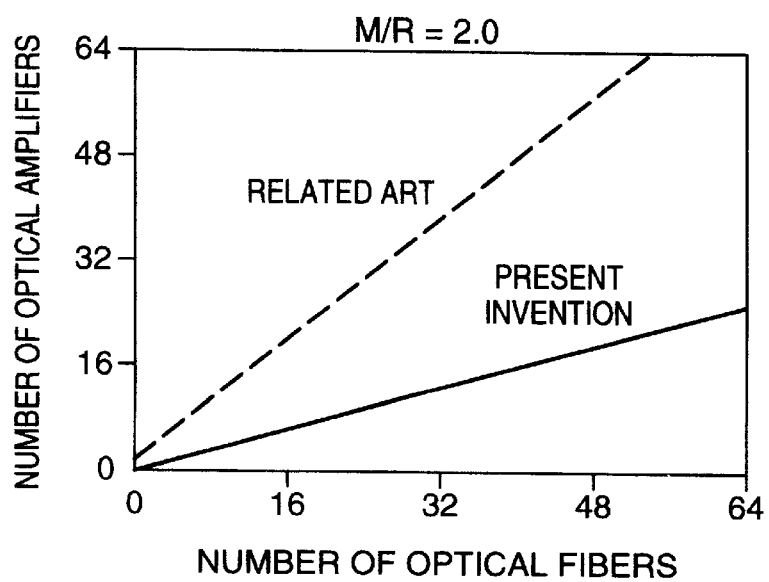

In order to quantitatively comparing merits derived from the introduction of this kind of configuration, concerning the system configuration in FIG. 4 in the present invention and that in FIG. 2 in the related art, the following two values have been determined and compared with each other, i.e. the number of unit optical switch devices and the number of optical amplifiers which are needed in the optical switch matrices 19 and 20. FIG. 5 illustrates the result obtained. This calculation has been made on the following assumptions: 2 is a ratio in the number of the fibers between the working system and the protecting system (50% of the protecting fibers are prepared with reference to the number of the working fibers), employed as the strictly non-blocking matrix switch is a tree type matrix switch comprising 1×2 switches, and employed as the rearrangable non-blocking matrix switch is a Benes type matrix switch comprising 2×2 switches.

The present embodiment has made it possible to decrease the number of the needed optical switch devices and that of the needed optical amplifiers down to about ⅕th and ⅓rd of those in the related art configuration, respectively. This shows that the present embodiment is successful in simplifying the system configuration extremely. Since the optical switches and the optical amplifiers constitute the main part in the optical cross-connect system, the considerable decrease in the numbers needed makes a great contribution to a reduction in the system cost.

Figure 6A:
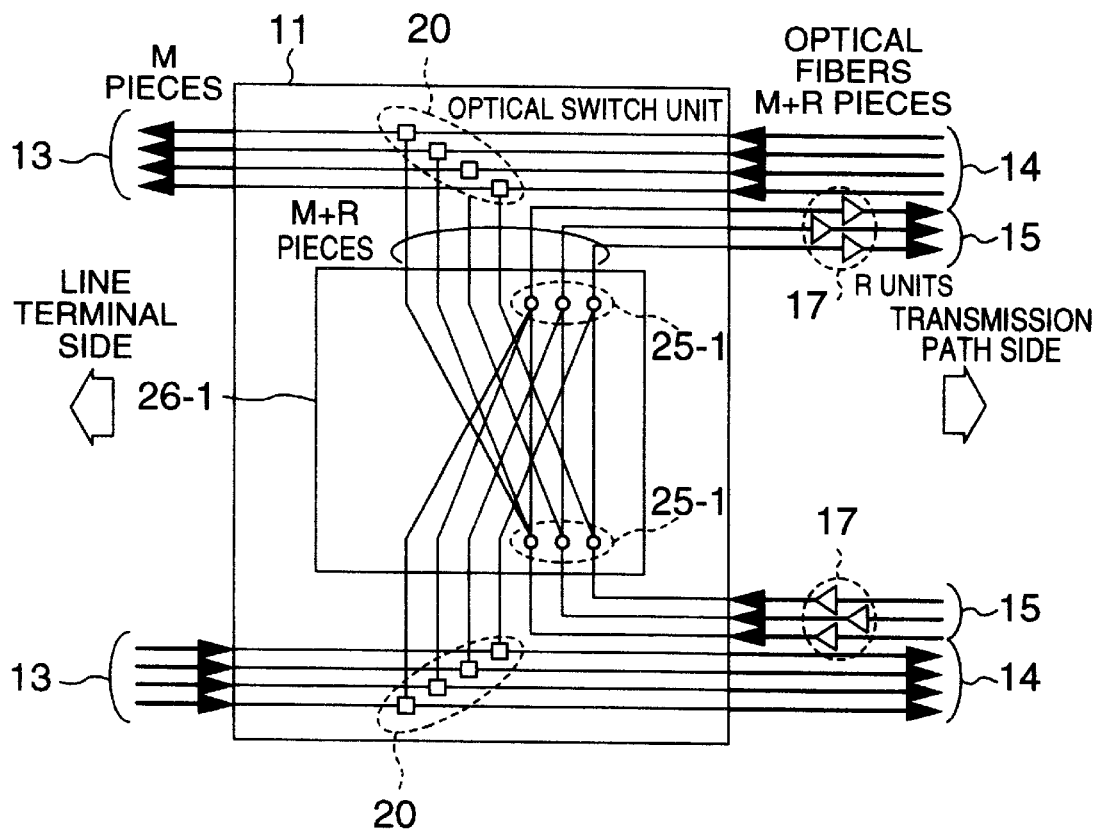
FIGS. 6A, 6B and 6C are diagrams for explaining a configuration of an optical switch unit in an optical cross-connect system as still another embodiment according to the present invention.

When performing switching of transmission paths with the use of an optical cross-connect system, all the destined transmission paths to be switched are required to satisfy predetermined switched destination transmission characteristic conditions (conditions such as wavelength dispersion values, propagation losses, and S/N ratios). Actually, however, many of the destined transmission paths to be switched do not satisfy the conditions. Paying attention to this point, an embodiment shown in FIG. 6 has been devised. Namely, the configuration in FIG. 6 is an imperfect matrix configuration which is capable of at least ensuring a path connection in which there is a possibility of actually using or in future using a matrix switch for switching a connection to a protecting system.

Figure 6B:
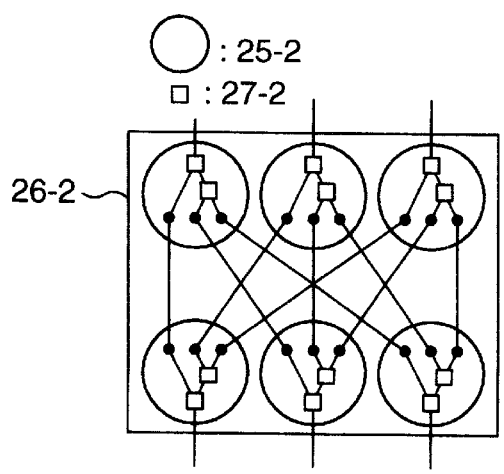
Figure 6C:
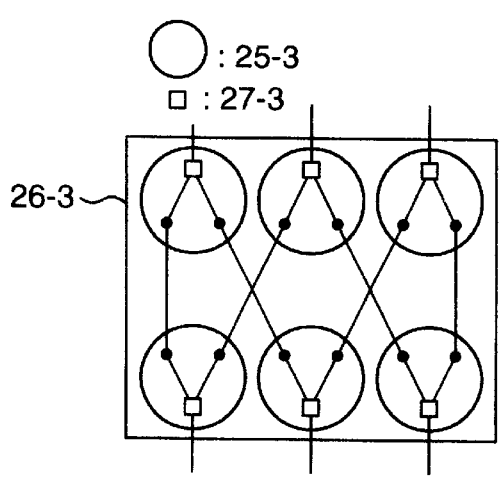

In the present embodiment, a basic structure of the switch matrix is a tree type structure. FIG. 6B shows an ordinary tree type 3×3 matrix switch. An optical branching switch 25-2 is located at each of input/output ports. The optical branching switch 25-2 has three ports, and the three ports are each connected completely with ports which are different from each other. Accordingly, it is possible to connect an arbitrary input with an arbitrary output. The optical branching switch 25-2 comprises 2 units of 1×2 optical switches 27-2. Meanwhile, FIG. 6C shows a partially-unconnectable tree type 3×3 matrix switch employed in the present embodiment. Each of optical branching switches 25-3 comprises 1 unit of 1×2 optical switch 27-3, and turns out to be a two-branching switch. In this case, the configuration is that although, for each of the two ports, there exists one port unable to be connected therewith, the number of needed optical switches has been decreased. In this way, in the present embodiment, the partially-unconnectable matrix switch which selects the connection by removing the switch devices corresponding to connections with no possibility of being used. This kind of configuration, of course, makes it possible to decrease the number of the needed switch devices in the matrix unit and at the same time to decrease the number of connected stages of the switch devices.

In the configuration in FIG. 6B, of 9 ways of connections, the connection for which the number of connected stages of the switch devices is 2 stages is 1 way, the connection for which the number is 3 stages is 4 ways, and the connection for which the number is 4 stages is 4 ways. However, in the configuration in FIG. 6C, of 6 ways of connections, the connection for which the number is 2 stages is 6 ways and there is no other connection. This means that the number of connected stages of the switch devices is decreased. A decrease in the number of connected stages of the switch devices are effective in improving insertion loss of the whole system and in reducing crosstalk between the channels. It becomes possible to decrease the number of the optical switches and the crosstalk by employing the optical switch unit which has a function of blocking unnecessary connections.

FIG. 7 shows a further embodiment of the present invention. In order to make an optical transmission network highly reliable, there occurs a necessity of automatically and at high speed recovery from a trouble of a line terminal itself as well as a failure in a transmission path. For this purpose, it is general to locate protecting line terminals in advance and introduce a mechanism in which when a line terminal is troubled, a protecting line terminal is operated instead of the troubled line terminal. By the way, in the above-described transmission system in the related art, transmission paths (optical fibers) were specifically allotted to the protecting line terminals, too.

However, in the transmission system in which the optical cross-connect system is introduced and correspondence between the transmission paths and the line terminals is dynamically varied, there is not necessarily need of exclusively allotting the fibers to the protecting line terminals. Rather, from the viewpoints such as an enhancement in utilization efficiency of the transmission paths and a cost reduction by means of a needed hard scale downsizing in the cross-connect system, it is desirable that, quitting the specific allotment of the fibers to the protecting line terminals, when a line terminal is troubled, only the line terminals are switched to the protecting system, and, concerning the transmission paths, the transmission path with which the troubled line terminal has been connected should continue to be used.

In FIG. 7, not only working line terminals 30 but also a protecting line terminal 29 are connected with an optical switch unit 33 through an optical fiber 31. For example, when a working line terminal 30-1 is troubled, optical amplifiers 36 and optical fibers 38, which have been connected with the troubled working line terminal 30-1 through the optical switch unit 33, are made to be connected with the protecting line terminal 29. This allows the disconnected connection to be restored. Even if some other working line terminal is troubled, the connection can be restored as long as the protecting line terminal 29 is in no use then.

Figure 8A:
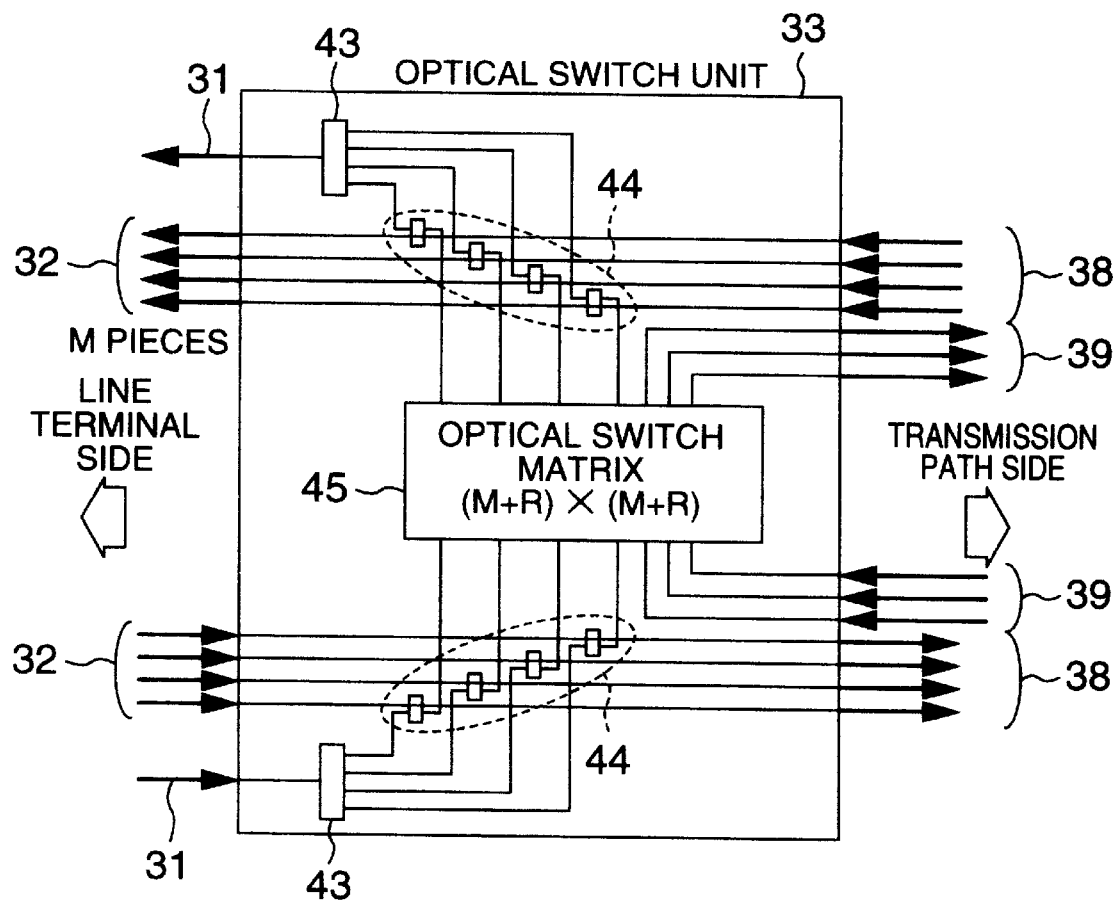
FIGS. 8A, 8B and 8C are diagrams for explaining a configuration of an optical switch unit in an optical cross-connect system as a still further embodiment according to the present invention.

FIG. 8 shows an embodiment of inner configuration of an optical cross-connect system for supporting the configuration shown in FIG. 7. When an arbitrary line terminal is troubled, instead of optical fibers 32 connected with the line terminal, operations of optical selection switches 43 and switching optical switches 44 allow optical fibers 31 connected with the protecting line terminals to output towards optical fibers 38 which output towards the transmission paths. This makes it possible to remove transmission paths (optical fibers) specifically allotted to the protecting line terminal, thus allowing an enhancement in utilization efficiency of the optical fibers. Moreover, the reduction in the number of input/output fibers for an optical switch unit 33 in the optical cross-connect system makes it possible to downsize the hard scale needed.

Figure 8B:
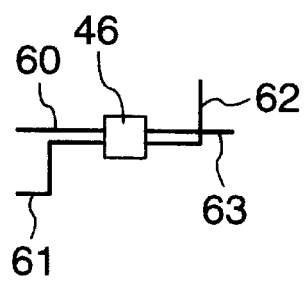
Figure 8C:
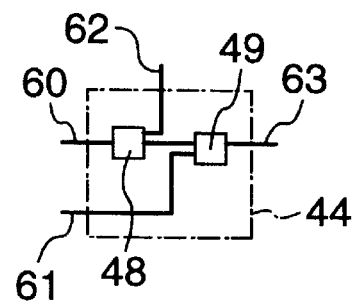

Incidentally, illustrated by the configuration in FIG. 8 is a switching from a state in which a protecting optical fiber 60 is connected with a protecting optical fiber 63 to a state in which they are replaced by an optical fiber 61 connected with the protecting line terminals through an optical selection switch 43 and an optical fiber 62 to be connected with protecting optical fibers 39 through an optical switch matrix 45. As shown in FIGS. 8B and 8C, there are the following two methods for performing the switching: One is a configuration embodiment 1 in which a 2×2 optical switch 46 carries out the switching integrally, and the other is a configuration embodiment 2 in which two units of 1×2 optical switches 47 and 48 embody the switching in an independent manner. The former allows the configuration to be simplified, and the latter makes it possible to make the system highly reliable due to separation of the functions (an effect based on the relation that the optical switches 47 and 48 can compensate for the troubles thereof with each other).

Figure 9:
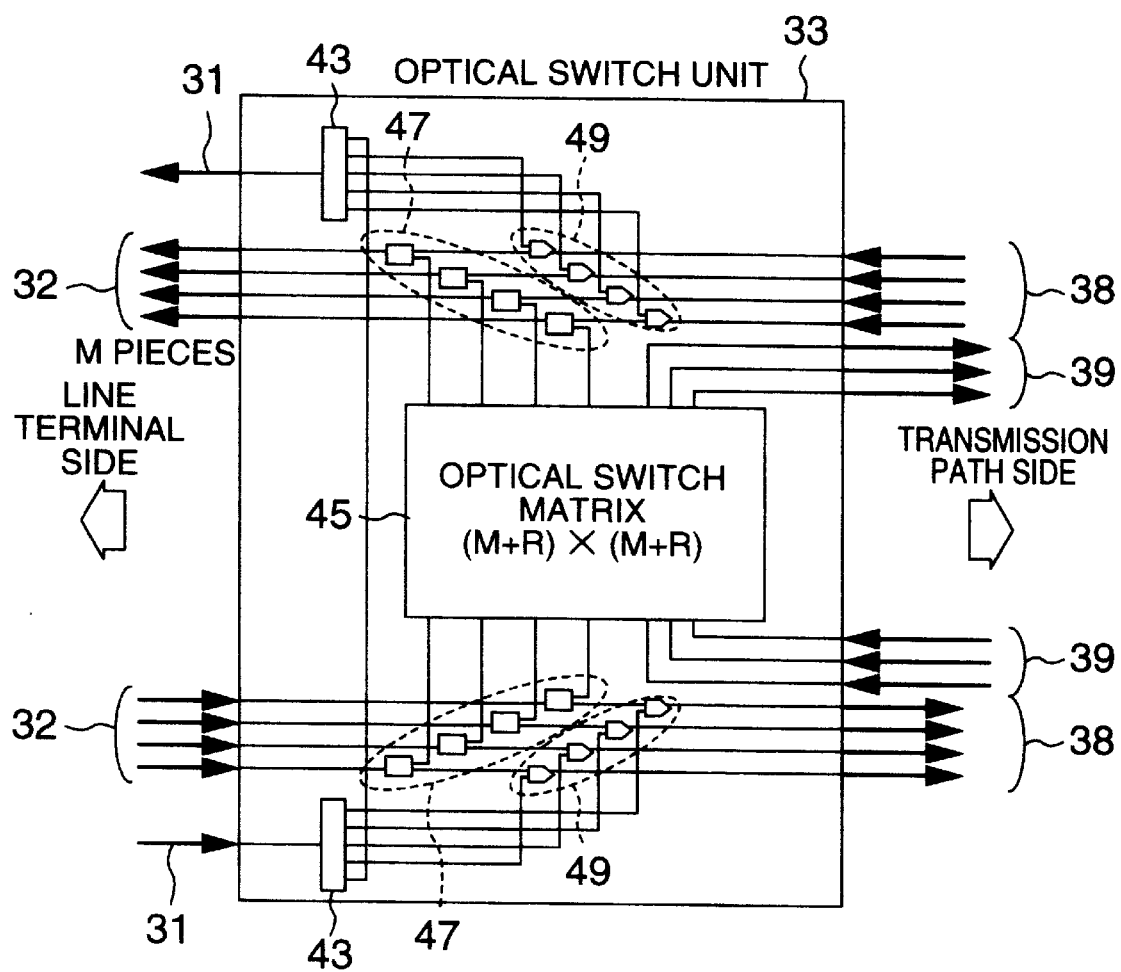
FIG. 9 is a diagram for explaining a configuration of an optical switch unit in an optical cross-connect system as an even further embodiment according to the present invention.

FIG. 9 shows another embodiment of an optical cross-connect system for supporting the configuration in FIG. 7. The characteristic in the present embodiment is that optical couplers 49 are employed as a working/protecting line terminal switching unit, which is the optical switch 48 in the configuration in FIG. 8. The employment of the optical couplers 49, which are so-called passive devices, makes it possible to expect a low trouble rate as compared with the case of the optical switch 48.

In order to restore the transmission by switching to the protecting system, it is necessary for the protecting transmission paths to remain in a good condition. Consequently, it is desirable that the optical cross-connect system has a mechanism of ascertaining conditions of the protecting transmission paths. Although a variety of methods can be considered so as to inspect conditions of the transmission paths, the surest method is to transmit a predetermined high-speed optical signal. FIG. 10 shows a configuration of an optical cross-connect system which, for the transmission of such a signal, is provided with a mechanism for inputting an output from a protecting line terminal into a protecting transmission path through optical fibers 31, optical selection switches 43, an optical selection switch 53, and optical switches 54. Similarly, a high-speed optical signal from the protecting transmission path is transferred, so as to be inspected, to the protecting line terminal through optical fibers 39, optical switches 52, an optical selection switch 51, the optical selection switches 43, and the optical fibers 31. The configuration makes it possible not only to surely inspect conditions of the protecting transmission paths but also to ascertain operations of the protecting line terminals themselves.

According to the present invention, it becomes possible to extremely decrease the number of members constituting the switch matrix. This results in a considerable enhancement in the reliability and a reduction in the cost, and at the same time makes it easy to fabricate a high-capacity optical cross-connect system. Also, the decrease in the number of the optical switches brings about reductions in both the insertion losses and crosstalk between the channels. This improves transmission quality of the optical signal, thus making it possible to increase the transmission rate for each channel.

We claim:

1. An optical cross-connect system , provided among line terminals, working fibers and protecting fibers, and switching a fiber connected with said line terminals, comprising:

an input switching optical switch provided between an output port to the line terminals and a working input fiber port;

an output switching optical switch provided between an input port from the line terminals and a working output fiber port; and a protecting path setting optical switch unit, the input of which are an output from said output switching optical switch and an input from a protecting input fiber port, and the output of which are an input to said input switching optical switch and an output to a protecting output fiber port, wherein a rearrangeable non-blocking optical switch matrix configuration is employed as a configuration of said protecting path setting optical switch unit.

2. The optical cross-connect system as claimed in claim 1, wherein a means for switching a destination for each connected transmission path between each working line terminal and each protecting line terminal corresponding to each other is added.

3. The optical cross-connect system as claimed in claim 2, wherein the means for switching between the working line terminals and the protecting line terminals comprises
an optical selection switch for selecting a working line terminal to be switched and
a switching optical switch connected on the selection output side of said optical selection switch.

4. The optical cross-connect system as claimed in claim 2, wherein the means for switching between the working line terminals and the protecting line terminals comprises
an optical selection switch for selecting a working line terminal to be switched and
an optical coupler connected on the selection output side of said optical selection switch.

5. The optical cross-connect system as claimed in claim 2, wherein there is provided a means for connecting to a protecting transmission line an optical output which is derived from a protecting line terminal and branched by an optical selection switch.

6. An optical cross-connect system provided among line terminals, working fibers and protecting fibers, and switching a fiber connected with said line terminals, comprising:
an input switching optical switch provided between an output port to the line terminals and a working input fiber port;
an output switching optical switch provided between an input port from the line terminals and a working output fiber port; and
a protecting path setting optical switch unit, the input of which are an output from said output switching optical switch and an input from a protecting input fiber port, and the output of which are an input to said input switching optical switch and an output to a protecting output fiber port,
wherein a blocking configuration or an incomplete matrix configuration which satisfies a predetermined protecting connection is employed as a configuration of said protecting path setting optical switch unit.

7. the optical cross-connect system as claimed in claim 6, wherein a means for switching a destination for each connected transmission path between each working line terminal and each protecting line terminal corresponding to each other is added.

8. The optical cross-connect system as claimed in claim 7, wherein the means for switching between the working line terminals and the protecting line terminals comprises
an optical selection switch for selecting a working line terminal to be switched and
a switching optical switch connected on the selection output side of said optical selection switch.

9. The optical cross-connect system as claimed in claim 7, wherein the means for switching between the working line terminals and the protecting line terminals comprises
an optical selection switch for selecting a working line terminal to be switched and
an optical coupler connected on the selection output side of said optical selection switch.

10. The optical cross-connect system as claimed in claim 7, wherein there is provided a means for connecting to a protecting transmission line an optical output which is derived from a protecting line terminal and branched by an optical selection switch.

11. An optical cross-connect system provided among line terminals, working fibers and protecting fibers, and switching a fiber connected with said line terminals, comprising:
an input switching optical switch provided between an output port to the line terminals and a working input fiber port;
an output switching optical switch provided between an input port from the line terminals and a working output fiber port; and
a protecting path setting optical switch unit, the input of which are an output from said output switching optical switch and an input from a protecting input fiber port, and the output of which are an input to said input switching optical switch and an output to a protecting output fiber port,
wherein means for switching a destination for each connected transmission path between each working line terminal and each protecting line terminal corresponding to each other is added.

12. The optical cross-connect system as claimed in claim 11, wherein the means for switching between the working line terminals and the protecting line terminals comprises
an optical selection switch for selecting a working line terminal to be switched and
a switching optical switch connected on the selection output side of said optical selection switch.

13. The optical cross-connect system as claimed in claim 11, wherein the means for switching between the working line terminals and the protecting line terminals comprises
an optical selection switch for selecting a working line terminal to be switched and
an optical coupler connected on the selection output side of said optical selection switch.

14. The optical cross-connect system as claimed in claim 11, wherein there is provided a means for connecting to a protecting transmission line an optical output which is derived from a protecting line terminal and branched by an optical selection switch.

15. An optical transmission system, wherein the optical cross-connect system as claimed in claim 11 is employed, and
when a failure occurs on a line or a line terminal is troubled, an automatic switching to the protecting path or a protecting line terminal is performed.

* * * * *